(12) United States Patent
Shapiro

(10) Patent No.: US 7,263,690 B1
(45) Date of Patent: Aug. 28, 2007

(54) MECHANISM FOR SAFE BYTE CODE IN A TRACING FRAMEWORK

(75) Inventor: Michael W. Shapiro, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 728 days.

(21) Appl. No.: 10/713,651

(22) Filed: Nov. 14, 2003

(51) Int. Cl.
*G06F 9/44* (2006.01)

(52) U.S. Cl. .................... 717/128; 717/126; 712/227

(58) Field of Classification Search ............. 717/128
See application file for complete search history.

(56) References Cited

U.S. PATENT DOCUMENTS

| | | | | |
|---|---|---|---|---|
| 4,713,749 A * | 12/1987 | Magar et al. | ............ | 712/241 |
| 5,432,795 A * | 7/1995 | Robinson | ............ | 717/125 |
| 5,668,999 A * | 9/1997 | Gosling | ............ | 717/126 |
| 5,692,047 A * | 11/1997 | McManis | ............ | 713/167 |
| 5,740,441 A * | 4/1998 | Yellin et al. | ............ | 717/134 |
| 5,748,964 A * | 5/1998 | Gosling | ............ | 717/126 |
| 5,938,778 A * | 8/1999 | John et al. | ............ | 714/45 |
| 5,999,731 A * | 12/1999 | Yellin et al. | ............ | 717/126 |
| 6,026,237 A * | 2/2000 | Berry et al. | ............ | 717/130 |
| 6,075,940 A * | 6/2000 | Gosling | ............ | 717/126 |
| 6,092,147 A * | 7/2000 | Levy et al. | ............ | 711/16 |
| 6,125,441 A * | 9/2000 | Green | ............ | 712/210 |
| 6,151,618 A * | 11/2000 | Wahbe et al. | ............ | 718/1 |
| 6,247,171 B1 * | 6/2001 | Yellin et al. | ............ | 717/126 |
| 6,477,702 B1 * | 11/2002 | Yellin et al. | ............ | 717/126 |
| 6,581,206 B2 * | 6/2003 | Chen | ............ | 717/143 |
| 6,704,923 B1 * | 3/2004 | Gosling | ............ | 717/126 |
| 6,742,178 B1 * | 5/2004 | Berry et al. | ............ | 717/130 |
| 6,851,112 B1 * | 2/2005 | Chapman | ............ | 718/1 |
| 6,988,261 B2 * | 1/2006 | Sokolov et al. | ............ | 717/118 |
| 7,065,747 B2 * | 6/2006 | Sokolov et al. | ............ | 717/126 |
| 2002/0040470 A1 * | 4/2002 | Guthrie et al. | ............ | 717/126 |
| 2003/0135844 A1 * | 7/2003 | Yellin et al. | ............ | 717/126 |
| 2003/0154468 A1 * | 8/2003 | Gordon et al. | ............ | 717/143 |
| 2004/0015872 A1 * | 1/2004 | Crocker | ............ | 717/126 |
| 2004/0015873 A1 * | 1/2004 | Sokolov et al. | ............ | 717/127 |
| 2005/0044542 A1 * | 2/2005 | Grimaud et al. | ............ | 717/174 |

OTHER PUBLICATIONS

Leroy, X. 2003. Java Bytecode Verification: Algorithms and Formalizations. J. Autom. Reason. 30, 3-4 (Aug. 2003). 235-269.*
Basin, D., Friedrich, S., and Gawkowski, M. 2003. Bytecode Verification by Model Checking. J. Autom. Reason. 30, 3-4 (Aug. 2003), 399-444.*

(Continued)

*Primary Examiner*—Tuan Dam
*Assistant Examiner*—J. Derek Rutten
(74) *Attorney, Agent, or Firm*—Osha Liang LLP

(57) ABSTRACT

A method for evaluating safety of a tracing program involves loading a byte code in a tracing framework, where the byte code includes instructions of the tracing program, validating the instructions when loading the byte code, performing one or more safety checks on the instructions while performing virtual machine emulation of the instructions, reporting an error condition and aborting virtual machine emulation of an unsafe instruction in the instructions when the safety check(s) detect(s) the unsafe instruction, and completing virtual machine emulation of a safe instruction in the instructions when the safety check(s) detect(s) the safe instruction, after aborting virtual machine emulation of the unsafe instruction.

28 Claims, 3 Drawing Sheets

OTHER PUBLICATIONS

Barbuti, R., Tesei, L., Bernardeschi, C., and De Francesco, N. 2002. Fixing the Java bytecode verifier by a suitable type domain. In Proceedings of the 14th international Conference on Software Engineering and Knowledge Engineering (Ischia, Italy, Jul. 15-19, 2002). SEKE '02, Vol. 27. ACM Press, New York, NY, 377-382.*

Aho, Sethi, and Ullman, "Compilers: Principles, Techniques, and Tools",1986, Addison-Wesley, ISBN 0-201-10088-6, Chapter 5.*

Hauswirth, M., Kerer, C., and Kurmanowytsch, R. 2000. A secure execution framework for Java. In Proceedings of the 7th ACM Conference on Computer and Communications Security (Athens, Greece, Nov. 1-4, 2000). P. Samarati, Ed. CCS '00. ACM Press, New York, NY,, 43-52.*

Tamches, Ariel and Miller, Barton P; Fine-Grained Dynamic Instrumentation of Commodity Operating System Kernels; [Online ]; http://www.usenix.org/publications/library/proceedings/osdi99/full_papers/tamches/tamches.pdf, Published Feb. 1999.

Murayama, John; "Performance Profiling Using TNF";[Online ]; http://developers.sun.com/solaris/articles/tnf.html, Jul. 2001.

Lorch, Jacob R. and Smith, Alan J.; "The Vtrace Tool: Building a system Tracer for Windows NT and Windows2000"; [Online ]http://msdn.microsoft.com/msdnmag/issues/1000/Vtrace/default.aspx, Oct. 2000.

"Chapter 10. The Generalized Trace Facility (GTF) ";[Online ]; http://publib.boulder.ibm.com/cgi-bin/bookmgr/BOOKS/IEA2V100/CCONTENTS, Jan. 2001.

Mirgorodskii, Alex; "The Path to Portable Kernel Instrumentation: the Kerninst API"; http://www.dyninst.org/mtg2003/slides/KerninstAPI.pdf, Apr. 2003.

Richard Moore, et al.; "IDM Dynamic Probes"; http://www-124.ibm.com/developerworks/opensource/linux/projects/dprobes/README, 2000.

K. Yaghmour et al.; "Measuring and Characterizing System Behavior Using Kernel-Level Event Logging"; Proceedings of the 2000 Usenix Annual Technical Conference; Jun. 18-23, 2000, San Diego, California, USA.

* cited by examiner

MECHANISM FOR SAFE BYTE CODE IN A TRACING FRAMEWORK

BACKGROUND

A tracing framework is a collection of software routines and tools that permit a user to instrument and record the activity of one or more executing programs, including an operating system kernel. Tracing frameworks typically permit users to describe instrumentation requests by naming one or more probes, which are locations of interest that can be used as data-recording sites within an instrumented program. Tracing frameworks also permit users to associate these probes with one or more actions. The actions describe what tracing operations should be performed when the executing instrumented program passes through the probe site (i.e., when a probe triggers). Tracing frameworks typically provide either a defined set of actions at each probe, a set of user-selectable actions, or the ability to execute an essentially arbitrary set of actions composed in a programming language (such as C, C++, or Pascal). In tracing frameworks that support a programming language for describing actions, language statements are compiled into an intermediate form or directly into machine code and are then executed when the probe triggers.

If the tracing framework permits instrumentation of the running operating system kernel itself, the instrumentation service takes the compiled intermediate form of the tracing request and loads it into the operating system kernel as part of enabling the corresponding instrumentation. The instrumentation code executes as part of the operating system kernel itself either directly on the processor or through a virtual machine or interpreter provided by the instrumentation service that executes inside the operating system kernel. Because the operating system is an essential service without which the computer system cannot function, a tracing framework for an operating system kernel makes provisions for safety, so an improperly constructed or maliciously designed tracing program cannot damage the operating system or deny service to users. If provisions for safety are not resolved, the tracing system cannot be usefully deployed in any environment where the operating system is shared between users or performs an important function.

Implementers of tracing frameworks typically ignore this problem and rely on the access control measures for the users (i.e., to only allow persons that are sufficiently privileged or knowledgeable on the system), or the implementers have implemented a variety of cumbersome mechanisms to enforce security of the compiled instrumentation.

SUMMARY

In general, in one aspect, an embodiment of the invention relates to a method for protecting a byte code in a tracing framework, comprising validating a plurality of instructions when loading the byte code, and performing at least one safety check while executing the plurality of instructions during a virtual machine emulation, wherein the at least one safety check evaluates for a control transfer to an earlier instruction in the byte code sequence.

In general, in one aspect, an embodiment of the invention relates to a mechanism for protecting a byte code, comprising an instruction validator configured to validate a plurality of instructions when loading the byte code, a safety check facility configured to perform at least one safety check while executing the plurality of instructions during a virtual machine emulation, wherein the at least one safety check evaluates for a transfer to an earlier instruction in the byte code sequence.

In general, in one aspect, an embodiment of the invention relates to a computer system for protecting a byte code in a tracing framework, comprising a processor, a memory, a storage device, and software instructions stored in the memory for enabling the computer system to validate a plurality of instructions when loading the byte code, and perform at least one safety check while executing the plurality of instructions during a virtual machine emulation, wherein the at least one safety check evaluates for a control transfer to an earlier instruction in the byte code sequence.

Other aspects of embodiments of the invention will be apparent from the following description and the appended claims.

DETAILED DESCRIPTION

Figure 1:
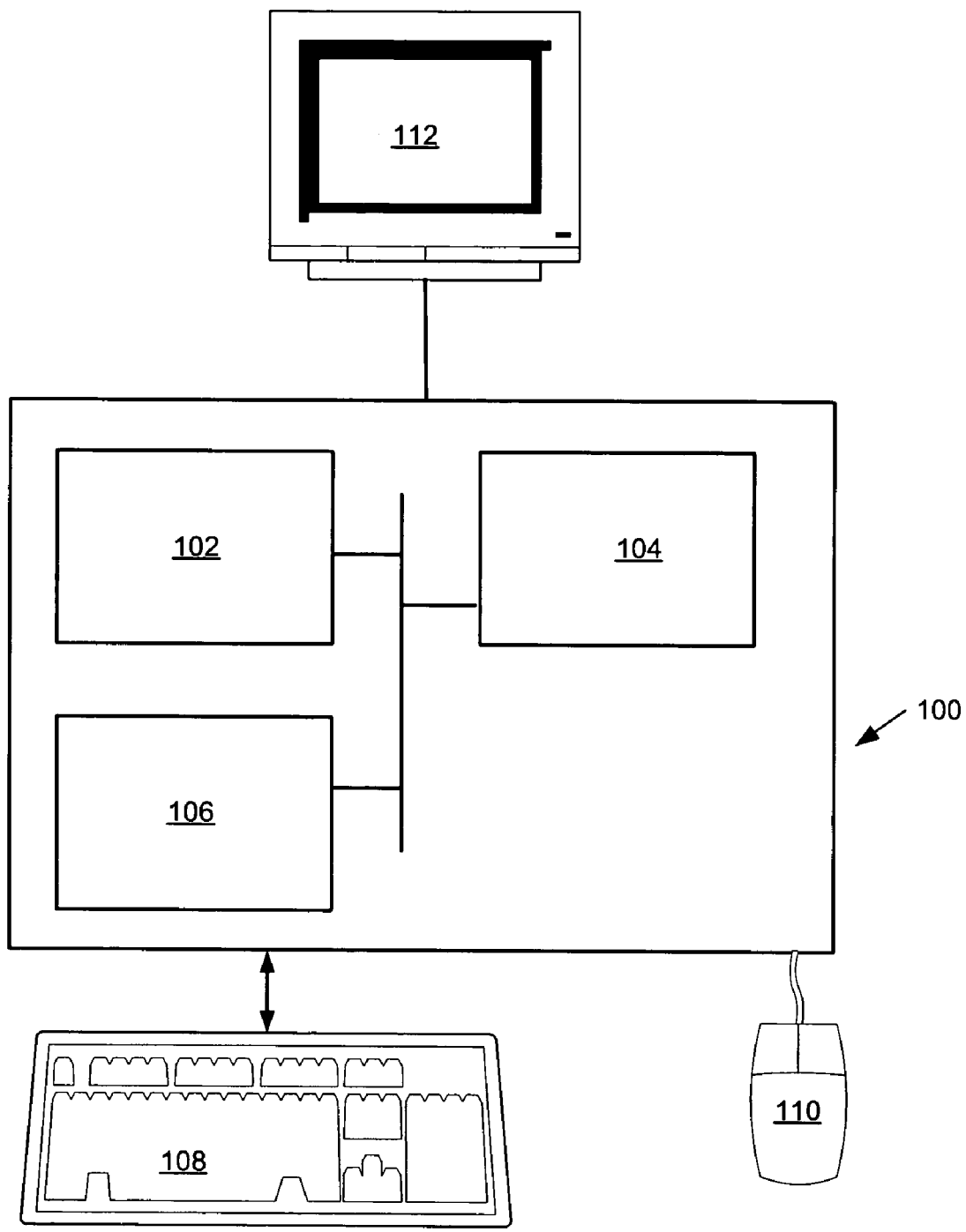
FIG. 1 shows a networked computer system in accordance with one embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

An embodiment of the invention may be implemented on virtually any type of computer regardless of the platform being used. For example, as shown in FIG. 1, a networked computer system (100) includes a processor (102), associated memory (104), a storage device (106), and numerous other elements and functionalities typical of today's computers (not shown). The networked computer (100) may also include input means, such as a keyboard (108) and a mouse (110), and output means, such as a monitor (112). The networked computer system (100) is connected to a local area network (LAN) or a wide area network via a network interface connection (not shown). Those skilled in the art will appreciate that these input and output means may take other forms. Further, those skilled in the art will appreciate that one or more elements of the aforementioned computer (100) may be located at a remote location and connected to the other elements over a network.

In one embodiment, the present invention relates to a virtual machine interpreter with safety mechanisms that permit complex and arbitrary programs to be constructed by a compiler and encoded in an instruction set byte code. This mechanism permits validation for safety against both damage to the system as well as denial-of-service attacks. These design features, combined with a set of run-time checks, permit arbitrary tracing programs to be compiled and loaded into the operating system kernel where the programs can be either rejected immediately or executed safely.

Figure 2:
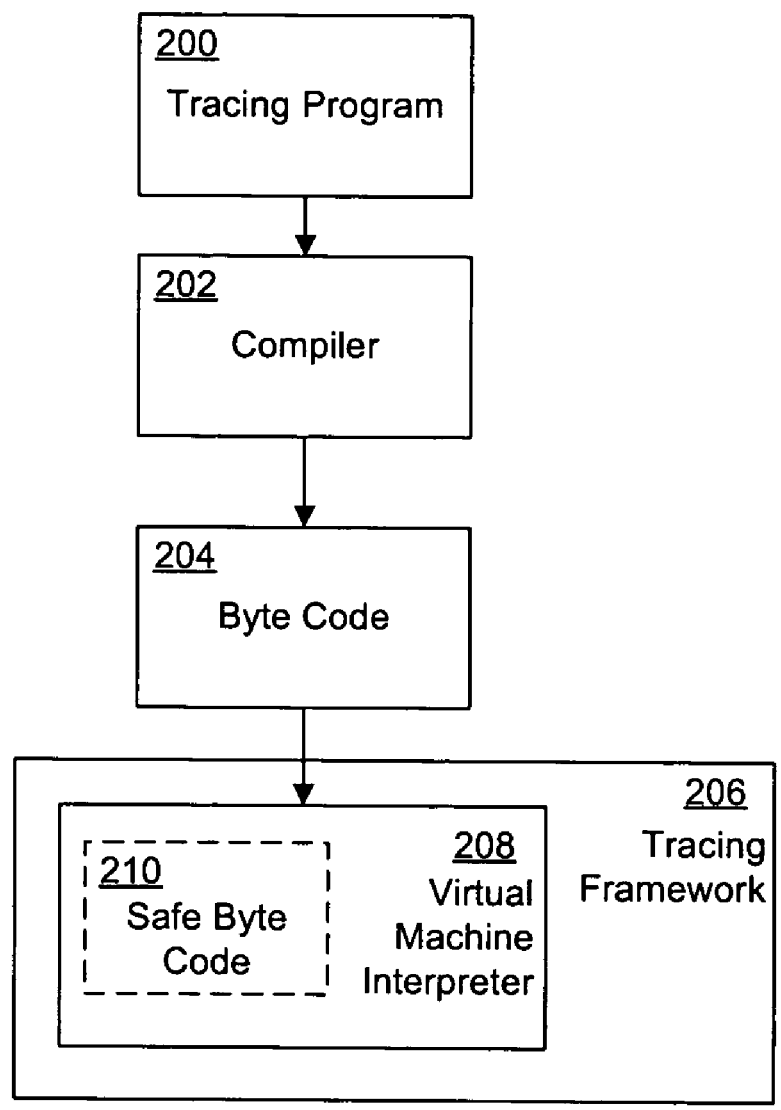
FIG. 2 shows a flow diagram for a mechanism for protecting byte code in a tracing framework in accordance with one embodiment of the invention.

FIG. 2 shows a flow diagram for a mechanism for protecting byte code in a tracing framework in accordance with one embodiment of the invention. A tracing program (200), including tracing functions desired by a user, is provided to a compiler (202) designed to accept the tracing program (200). The compiler (202) compiles the tracing program (200) into byte code (204) in a manner that is well-known in the art.

Byte code (204) is an instruction set that accompanies a virtual machine or program interpreter. This byte code (204) provides the same function for a virtualized representation of computer hardware as a standard microprocessor that is associated with an instruction set defining a set of binary encodings.

Once the byte code is generated, a tracing framework (206) accepts the byte code (204) as input and begins to evaluate the byte code using a mechanism, such as a virtual machine interpreter (208). This interpreter (208) includes functionality described in FIG. 3 below to define safe byte code (210) from a portion of the byte code (204). In one embodiment of the invention, all byte code (204) resides within the virtual machine interpreter (208) where it is accessed and emulated. Once the byte code (204) is deemed safe byte code (210) it may be used by a virtual machine.

In order to provide functionality suitable for arbitrary instrumentation code, a virtual machine provides a set of instructions similar to those supported by common hardware microprocessors. Table 1 identifies a set of instructions in column 1 with a corresponding description of the instruction (as related to virtual machines) in column 2. Alongside each of these instruction categories, column 3 shows potential opportunities for malformed or maliciously designed programs to damage the operating system or deny service to system users if such instructions are executed without proper safety mechanisms by a virtual machine interpreter.

TABLE 1

| Instruction | Description | Potential Danger |
| --- | --- | --- |
| Arithmetic and logical operations | A virtual machine supports the ability to add, subtract, multiply, and divide numbers and perform other common logical operations on them (e.g., boolean AND, OR, etc). | Several arithmetic operations cause processor exceptions to indicate certain error conditions. For example, integer division by zero typically results in a hardware exception condition on most microprocessors. |
| Load operations | A virtual machine supports the ability to access memory locations associated with the instrumented program (in this case, the data address space of the operating system kernel itself). | Load operations may be misaligned, in that some microprocessors require that a 2-byte load occur on an address value that is a multiple of 2, a 4-byte load occur on an address value that is a multiple of 4, etc. If a misaligned load is attempted, the processor signals an exception.
Load operations may be attempted from invalid addresses. Modern operating systems use a technique called virtual memory whereby the set of addresses associated with a user process or the operating system kernel are indirectly mapped to the physical memory addresses of the computer system. The address space of the operating system kernel is therefore sparsely populated in that not all addresses are valid and mapped to a physical memory location assigned to the operating system kernel. If a load from an address with no corresponding translation to a physical memory location is attempted, the processor signals an exception.
Load operations may be attempted from addresses that are mapped to hardware devices other than memory storage and that have side effects when accessed, such as device hardware programmable input/output registers.
Some modern operating system kernels map device control registers into the address space of the operating system so that they can be manipulated with load and store instructions. If some of these locations have side effects when loads are attempted, a sequence of loads incompatible with the mechanisms of the underlying device hardware could damage or disrupt the operation of the device or computer system itself. |
| Store operations | A virtual machine supports the ability to modify memory locations associated with the tracing program itself. This permits such programs to create data structures and manipulate variables. | Store operations may be misaligned in the same manner as loads and can trigger a processor exception. Store operations may be attempted to invalid locations in the same manner as loads and can trigger a processor exception.
Store operations may be attempted to memory-mapped device hardware registers with side effects in the same manner as loads, resulting in damage to or disruption of a hardware device or the system.
Store operations may also be attempted to a memory location that is properly aligned and valid but that is associated with a part of the operating system kernel other than the storage allocated by the virtual machine for use by the tracing program itself. If stores were permitted to such locations, tracing programs would be able to inadvertently or deliberately damage the operating system kernel. |
| Control transfer operations | A virtual machine supports the ability for the tracing program to direct the virtual machine to transfer control to a different point within the byte code instruction stream. Such control transfer operations are required to implement standard programming constructs such as if-then statements and logical conditions. | Control transfer instructions such as those that permit resetting the virtual machine program counter to a particular address (a "jump") and incrementing or decrementing the program counter by a particular amount (a "branch") can be used to transfer control to invalid addresses, addresses that are not associated with virtual machine code, and to create programs that are non-terminating (i.e., a program that loops infinitely without ever reaching a program control flow endpoint).
Illegal transfers can cause exception conditions such as those enumerated for loads and stores above. Infinite loops or infinite recursion mean that program control will never return from the virtual machine to the operating system kernel, thereby utilizing the instrumentation service as a denial-of-service attack against other operating system clients. |

In addition to the potential dangers included in Table 1, the following issues also need to be resolved to allow protection of byte code when using a virtual machine. First, if control transfer instructions are also provided to execute a set of predefined subroutines inside the virtual machine or instrumentation service, the program may be able to manipulate any of these services into one of the problem areas described above even though the service routines are not directly implemented in the tracing program. Second, if programs of arbitrary size are permitted, a single linear sequence of byte code instructions of vast size could be created that would take so long to execute, that the result is similar to a denial-of-service attack or to the behavior of a program with an infinite loop or infinite recursion.

In one embodiment, a set of attributes for a safe byte code and virtual machine interpreter is described below. These mechanisms provide for both efficient code validation and execution. The mechanisms also allow sufficient flexibility for the implementation of a programming language that permits useful expression evaluation and conditional constructs for use in a tracing framework that can be applied to an operating system.

Figure 3:
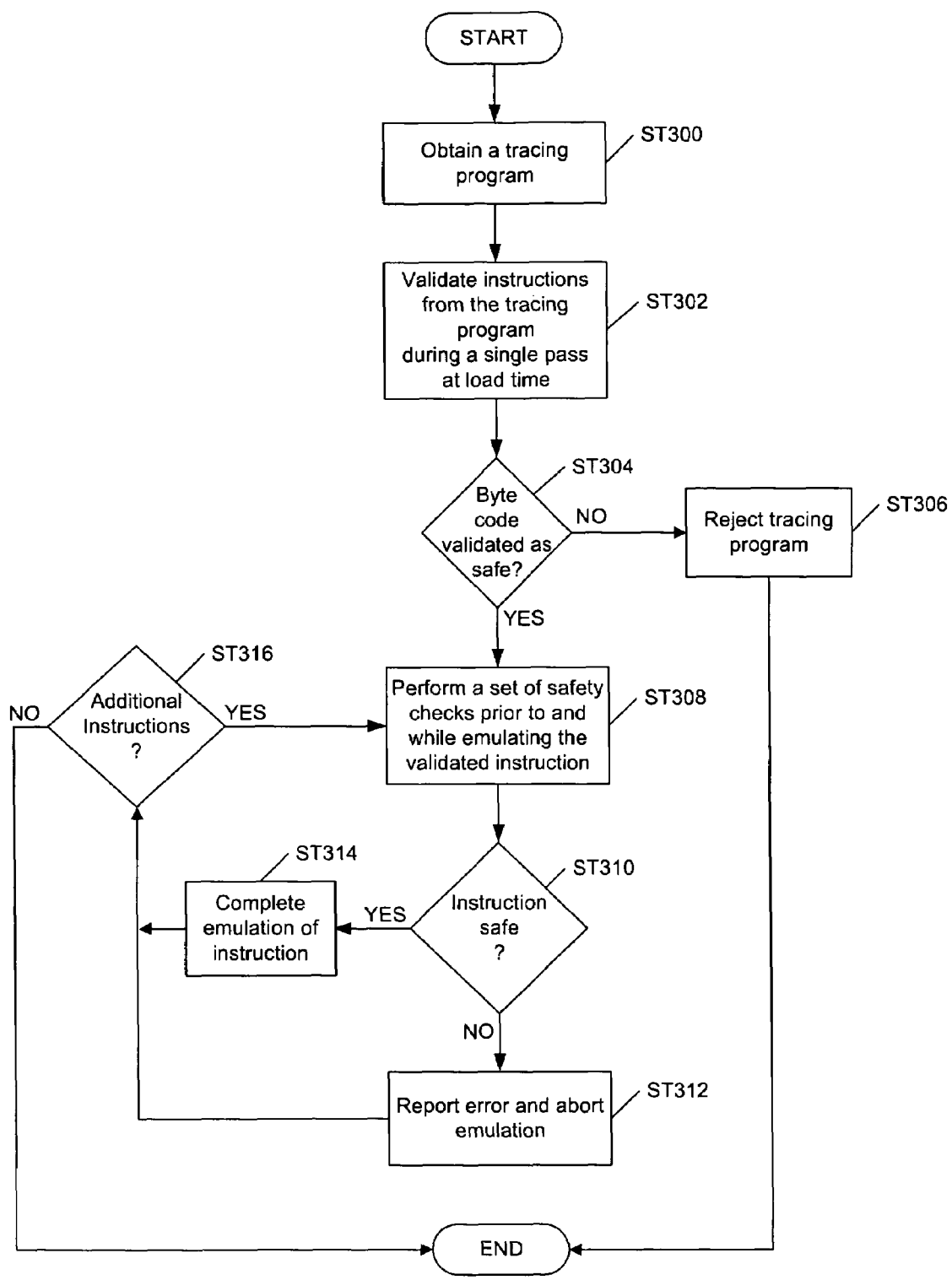
FIG. 3 shows a flow chart of a method for protecting byte code in a tracing framework in accordance with one embodiment of the invention.

FIG. 3 shows a flow chart of a method for protecting byte code in a tracing framework in accordance with one embodiment of the invention. This protection of byte code may be implemented by performing a two-pass approach. Initially, a tracing program is obtained (Step 300) using a command line or graphical user interface. In the first pass, instructions from the tracing program are validated during a single pass at load time (Step 302). The validation pass is extensive and described in detail below.

Next, a determination is made whether the instructions are validated as safe (Step 304). If the instructions are not validated as safe, then the tracing program is rejected (Step 306). If the instructions are validated, protection for the byte code is implemented. Specifically, a set of safety checks is performed prior to and while emulating the validated instructions (Step 308). This "emulation" pass is designed to address the potential dangers shown in Table 1 above, and is also discussed in detail below.

Upon completion of the safety checks, a determination is made whether the instruction is safe (Step 310). If the instruction is not safe, an error is reported and the emulation is aborted (Step 312). If the instruction is safe, emulation of the instruction is completed (Step 314). Next a determination is made whether additional instructions remain (Step 316). If instructions remain, control returns to Step 308 (i.e., a set of safety checks are performed on another validated instruction) and Steps 308-312 continue (as needed) until all instructions have been examined. If no instructions remain, processing terminates.

During the "validation" pass (Step 302) described above and shown in FIG. 3, the following five steps are performed by an instrumentation service for each instruction. First, a set of standard checks are performed to validate the instruction, including verifying that the "opcode" bits (i.e., the bits that describe the instruction type) name a valid operation. If an opcode is not valid, the global tracing program is rejected.

Second, a determination is made whether any operand names referenced by the instruction must refer to valid operands provided by the virtual machine emulator. If an operand name is not valid, the tracing program is rejected. The term operand name, as used above, refers to a label for a set of operands in either a register-based (i.e., instructions operate on a fixed-size set of fixed-size storage locations (registers)) or a stack-based model (i.e., instructions operate on a set of values pushed onto a virtualized stack of operands).

Third, any instructions that transfer control flow must be direct branches to a fixed offset or location within the tracing program instruction stream. The destination location within the instruction stream is computed from the instruction. If it lies outside of the instruction stream or at an instruction offset less than or equal to the offset of the branch instruction itself, then the tracing program is rejected.

Fourth, any instructions that invoke an instrumentation service subroutine are checked to determine that a valid subroutine is named; if not, the tracing program is rejected. Lastly, a determination is made whether the total number of instructions in the input byte code stream exceeds the configurable limit on the number of instructions. If so, the tracing program is rejected.

During the emulation pass (Step 304) described above and shown in FIG. 3, the following five steps are performed. First, for any arithmetic instruction that can result in a processor exception, the input operands are checked for exceptional conditions and, if any are found, execution is aborted. Alternately, a mechanism is provided whereby the processor exception for an arithmetic exception can be intercepted by the virtual machine emulator.

Second, for any load or store instruction, the effective address is checked for appropriate alignment before issuing the underlying microprocessor instructions. If the alignment is improper, execution is aborted. Alternately, a mechanism is provided whereby the processor exception for a misaligned load or store can be intercepted by the virtual machine emulator. Third, for any load or store instruction, a mechanism is provided whereby either the effective address is checked for validity prior to executing the load, or the processor exception for an invalid address is intercepted by the virtual machine emulator.

Next, for any load or store instruction, a mechanism is provided whereby the effective address is checked against a list of pre-computed address ranges assigned to a memory-mapped device hardware state. If the effective address falls within any of these ranges, emulation is aborted and no load or store instruction is issued. Lastly, for any store instruction, a mechanism is provided whereby the effective address is checked against a list of pre-computed address ranges assigned by the virtual machine to the tracing program. If the effective address does not fall within any of these ranges, emulation is aborted and no store instruction is issued.

In one embodiment of the invention, the attributes of a particular byte code named DTrace Intermediate Format (DIF) is described below. In DIF, instructions are encoded in 32-bit words where the highest order 8-bits are an integer naming one of the valid virtual machine opcodes. DIF also provides for a fixed number of registers named using integers by the virtual machine. When instructions refer to registers, one or more groups of 8-bits within the remaining 24-bits are assigned to indicate the name of each register referenced by the instruction.

In one embodiment of the invention, arithmetic instructions in DIF operate only on values that are currently stored in virtual machine registers. Further, load and store instructions operate on effective addresses stored in a single virtual machine register. For loads, the result of the load is placed in a register named in the instruction. For stores, the value to be stored is first placed in a register named in the instruction.

In one embodiment of the invention, an opcode for performing a subroutine call is provided in DIF that uses 16 of the remaining 24-bits in the instruction word to explicitly encode an integer corresponding to the desired subroutine. Further, a set of opcodes for performing branches based on a typical set of integer condition codes are provided. Each branch opcode uses the remaining 24-bits of the instruction word to indicate the offset of the instruction word within the instruction stream to which control should transfer if the condition codes match the desired branch condition.

In one embodiment, the present invention supports parallel evolution of the tracing framework compiler and instrumentation service. The invention also provides efficient transfer between the compiler and this service. The invention can be used uniformly in all mechanisms provided by the tracing framework for enabling or verifying instrumentation, and allows for stable, persistent storage of compiled tracing programs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evaluating safety of a tracing program, comprising:
    loading a byte code in a tracing framework, wherein the byte code comprises a plurality of instructions of the tracing program;
    validating the plurality of instructions when loading the byte code;
    performing at least one safety check on the plurality of instructions while performing virtual machine emulation of the plurality of instructions;
    reporting an error condition and aborting virtual machine emulation of an unsafe instruction in the plurality of instructions when the at least one safety check detects the unsafe instruction; and
    completing virtual machine emulation of a safe instruction in the plurality of instructions when the at least one safety check detects the safe instruction, after aborting virtual machine emulation of the unsafe instruction.

2. The method of claim 1, wherein the validating the plurality of instructions comprises:
    verifying that opcode bits for the plurality of instructions identify valid operations.

3. The method of claim 1, wherein the validating the plurality of instructions comprises:
    evaluating whether an operand name referenced in the plurality of instructions does not refer to a valid operand provided by the virtual machine emulation.

4. The method of claim 1, wherein the validating the plurality of instructions comprises:
    computing a destination location within an instruction stream from one of the plurality of instructions; and
    evaluating whether the destination location is invalid.

5. The method of claim 1, wherein the validating the plurality of instructions comprises:
    determining whether a subroutine name is valid, when one of the plurality of instructions invokes a named subroutine.

6. The method of claim 1, wherein the validating the plurality of instructions comprises:
    evaluating whether a total number of the plurality of instructions in the byte code exceeds a user-configurable limit.

7. The method of claim 1, wherein the validating occurs during a single pass over the plurality of instructions.

8. The method of claim 1, wherein the byte code comprises an instruction set of a virtual machine.

9. The method of claim 8, wherein the instruction set comprises at least one selected from the group consisting of an arithmetic operation, a logical operation, a load operation, a store operation, and a control transfer operation.

10. The method of claim 9, wherein the performing the at least one safety check comprises:
    evaluating whether the arithmetic operation results in a processor exception.

11. The method of claim 9, wherein the performing the at least one safety check comprises:
    evaluating an effective address of the load operation before issuing underlying instructions;
    determining an appropriate alignment for the effective address; and
    determining whether the effective address is improperly aligned based on the appropriate alignment.

12. The method of claim 9, wherein the performing the at least one safety check comprises:
    evaluating an effective address of the store operation before issuing underlying instructions;
    determining an appropriate alignment for the effective address; and
    determining whether the effective address is improperly aligned based on the appropriate alignment.

13. The method of claim 9, wherein the performing the at least one safety check comprises:
    evaluating an effective address of an operation for validity prior to executing the operation, wherein the operation is one selected from the group consisting of the load operation and the store operation.

14. The method of claim 9, wherein the performing the at least one safety check comprises:
    evaluating whether an effective address of an operation falls outside a list of pre-computed address ranges assigned to a memory-mapped device hardware state, wherein the operation is one selected from the group consisting of the load operation and the store operation.

15. The method of claim 9, wherein the performing the at least one safety check comprises:
    evaluating whether an effective address of the store operation falls outside a list of pre-computed address ranges assigned by the virtual machine to the tracing program.

16. A tracing framework, stored on a computer readable memory, comprising:
    an instruction validator configured to:
        load a byte code comprising a plurality of instructions of a tracing program, and
        validate the plurality of instructions when loading the byte code; and
    a safety check facility configured to:
        perform at least one safety check on the plurality of instructions while performing virtual machine emulation of the plurality of instructions,
        report an error condition and abort virtual machine emulation of an unsafe instruction in the plurality of instructions when the at least one safety check detects the unsafe instruction, and
        complete virtual machine emulation of a safe instruction in the plurality of instructions when the at least one safety check detects the safe instruction, after aborting virtual machine emulation of the unsafe instruction.

17. The tracing framework of claim 16, wherein the instruction validator is configured to validate the plurality of instructions by:
    verifying that opcode bits for the plurality of instructions identify valid operations.

18. The tracing framework of claim 16, wherein the instruction validator is configured to validate the plurality of instructions by:

evaluating whether an operand name referenced in the plurality of instructions does not refer to a valid operand provided by the virtual machine emulation.

19. The tracing framework of claim 16, wherein the instruction validator is configured to validate the plurality of instructions by:
computing a destination location within an instruction stream from one of the plurality of instructions; and
evaluating whether the destination location is invalid.

20. The tracing framework of claim 16, wherein the instruction validator is configured to validate the plurality of instructions by:
determining whether a subroutine name is valid, when one of the plurality of instructions invokes a named subroutine.

21. The tracing framework of claim 16, wherein the instruction validator is configured to validate the plurality of instructions by:
evaluating whether a total number of the plurality of instructions in the byte code exceeds a user-configurable limit.

22. The tracing framework of claim 16, wherein the instruction validator is configured to validate during a single pass over the plurality of instructions.

23. The tracing framework of claim 16, wherein the byte code comprises an instruction set of a virtual machine.

24. The tracing framework of claim 16, wherein the instruction set comprises at least one selected from the group consisting of an arithmetic operation, a logical operation, a load operation, a store operation, and a control transfer operation.

25. The tracing framework of claim 24, wherein the safety check facility is configured to perform the at least one safety check by:
evaluating whether the arithmetic operation results in a processor exception.

26. The tracing framework of claim 24, wherein the safety check facility is configured to perform the at least one safety check by:
evaluating an effective address of the load operation before issuing underlying instructions;
determining an appropriate alignment for the effective address; and
determining whether the effective address is improperly aligned based on the appropriate alignment.

27. The tracing framework of claim 24, wherein the safety check facility is configured to perform the at least one safety check by:
evaluating an effective address of the store operation before issuing underlying instructions;
determining an appropriate alignment for the effective address; and
determining whether the effective address is improperly aligned based on the appropriate alignment.

28. A computer system for evaluating safety of a tracing program, comprising:
a processor;
a memory;
a storage device; and
software instructions stored in the memory for enabling the computer system to:
load a byte code in a tracing framework, wherein the byte code comprises a plurality of instructions of the tracing program;
validate the plurality of instructions when loading the byte code;
perform at least one safety check on the plurality of instructions while performing virtual machine emulation of the plurality of instructions; and
report an error condition and abort virtual machine emulation of an unsafe instruction in the plurality of instructions when the at least one safety check detects the unsafe instruction, and
complete virtual machine emulation of a safe instruction in the plurality of instructions when the at least one safety check detects the safe instruction, after aborting virtual machine emulation of the unsafe instruction.

* * * * *